(12) United States Patent
Gărduş

(10) Patent No.: US 11,739,726 B2
(45) Date of Patent: Aug. 29, 2023

(54) COMBINED GRAVITATIONAL-HYDRAULIC ELECTRIC ENERGY STORAGE SYSTEM

(71) Applicant: Rareş-Alexandru Gărduş, Bucharest (RO)

(72) Inventor: Rareş-Alexandru Gărduş, Bucharest (RO)

(*) Notice: Subject to any disclaimer, the term of this patent is extended or adjusted under 35 U.S.C. 154(b) by 35 days.

(21) Appl. No.: 17/612,565

(22) PCT Filed: Nov. 11, 2020

(86) PCT No.: PCT/RO2020/050010
§ 371 (c)(1),
(2) Date: Nov. 18, 2021

(87) PCT Pub. No.: WO2021/101399
PCT Pub. Date: May 27, 2021

(65) Prior Publication Data
US 2022/0299003 A1    Sep. 22, 2022

(30) Foreign Application Priority Data
Nov. 20, 2019   (RO) .............................. a 2019 00774

(51) Int. Cl.
*F03B 13/06* (2006.01)

(52) U.S. Cl.
CPC ........ *F03B 13/06* (2013.01); *F05B 2260/422* (2020.08)

(58) Field of Classification Search
CPC ........................... F03B 13/06; F05B 2260/422
See application file for complete search history.

(56) References Cited

U.S. PATENT DOCUMENTS

| 4,207,741 A | 6/1980 | Rainey |
| 2012/0049673 A1 | 3/2012 | Koo |
| 2018/0149131 A1* | 5/2018 | Alkhars ................. F03B 15/16 |

FOREIGN PATENT DOCUMENTS

| CN | 204061053 U | 12/2014 |
| CN | 102734092 B | 1/2016 |

(Continued)

OTHER PUBLICATIONS

Florin Teodor Tanasescu, "Energy storage systems, a solution for optimizing the operation of electricity networks to which intermittent renewable sources of various energy storage systems are connected", AGIR Bulletin, 2015.

(Continued)

*Primary Examiner* — Viet P Nguyen
(74) *Attorney, Agent, or Firm* — Hershkovitz & Associates, PLLC; Abe Hershkovitz

(57) ABSTRACT

The system according to the invention comprises a weighted piston (30), which has the role of accumulating gravitational potential energy by lifting it vertically inside a cylinder (10) with the reinforced concrete wall, filled with water, the piston (30) being provided in the center with a high pressure pipe (20) which conducts pressurized water from the base of the cylinder to an electricity generating system (50) using impulse turbines, the water machined in the cycle of electricity production (50) being discharged back into the cylinder (10), above the piston. For the cycle of absorption and storage of energy from an electrical network, the system also comprises an electrical energy absorption system (60) which takes over the water above the piston (30) and inserts it into the high pressure channel (20), under the piston (30).

9 Claims, 5 Drawing Sheets

(56) References Cited

FOREIGN PATENT DOCUMENTS

| CN | 109881956 A | 6/2019 |
|---|---|---|
| DE | 102007062672 A1 | 8/2009 |
| DE | 102011012261 A1 | 8/2012 |
| RO | 126140 A2 | 3/2011 |
| WO | WO 2017/174081 A1 | 10/2017 |

OTHER PUBLICATIONS

English language translation of Summary of Florin Teodor Tanasescu, "Energy storage systems, a solution for optimizing the operation of electricity networks to which intermittent renewable sources of various energy storage systems are connected", AGIR Bulletin, 2015.

"Low-cost energy storage with minimal environmental impact", 2021, https://www.gravitypower.net/technology-gravity-power-energy-storage/.

Machine-generated English language translation of Abstract of CN 102734092 B (Jan. 13, 2016).

English language Abstract of CN 109881956 A (Jun. 14, 2019).

English language Abstract of CN 204061053 U (Dec. 31, 2014).

English language Abstract of DE 102007062672 A1 (Aug. 13, 2009).

English language Abstract of DE 102011012261 A1 (Aug. 30, 2012).

English language Abstract of RO 126140 A2 (Mar. 30, 2011).

International Search Report in International Application No. PCT/RO2020/050010, dated Jan. 26, 2021.

Written Opinion of the ISA in International Application No. PCT/RO2020/050010, dated Jan. 26, 2021.

Search Report and Written Opinion in related Romanian Patent Application No. a 2019 00774, dated Sep. 3, 2020.

* cited by examiner

COMBINED GRAVITATIONAL-HYDRAULIC ELECTRIC ENERGY STORAGE SYSTEM

CROSS-REFERENCE TO RELATED APPLICATIONS

This application is a U.S. National Phase of International Application No. PCT/RO2020/050010, filed on Nov. 11, 2020, which claims priority from Romanian Application No. a 2019 00774, filed on Nov. 20, 2019, the disclosures of which are hereby incorporated by specific reference thereto.

FIELD OF THE INVENTION

Combined gravitational-hydraulic electric energy storage system is intended primarily for electric grid operations, being used to store large/significant amounts of energy during periods of time in which the grid has excess electric energy production, in order to supply it during peak periods of consumption. The system provides energy storage with zero environmental costs and risk during operation and is constructed from material that is 100% recyclable at the end of the product's life. The initial environment costs (e.g., $CO_2$ footprint) are extremely small and no materials with high environmental risk are used. The system can act as a buffer for any green energy production system to store and provide a 100% consumer profiled electric grid operation.

DESCRIPTION OF RELATED ART

In the paper "Energy storage systems, a solution for optimizing the operation of electricity networks to which intermittent renewable sources of various energy storage systems are connected", AGIR Bulletin, Supplement 1/2015, several technologies are mentioned for storage of electricity, including the so-called "Pumped Hydro System (PHS). It consists of a "hydro-pumping station", which stores energy by pumping wastewater from a basin located at the outlet of the turbines (lower tank, where it is collected during the operation of the hydropower plant), in the upstream basin (upper tank), during periods or time intervals in which the system produces excess electricity. Such hydro pumping plants require a lower wastewater collection basin and use reversible turbine-generator assemblies, usually reversible turbines derived from Francis or Kaplan in order to be as efficient as possible, but with the disadvantage of very large volumes of water. The environmental cost of such technologies is extremely high due severe impact on the landscape and rivers.

On the site http://www.gravitypower.net/technology-gravity-power-energy-storage/is presented a gravitational power module (GPM-Gravity Power Module), which comprises a very large piston, which is placed in a deep well or mine, filled with water, the piston being provided with sliding gaskets to prevent leakage around it, and a vertical return pipe, located outside the piston, which connects the bottom of the piston to a reversible Francis turbine type coupled to an electric machine, located at ground level. The piston is made of reinforced rock or concrete. The well is filled with water once, at the beginning of the operations, and then closed, no additional water is required after this initial filling. When electricity is produced, as the piston descends, it forces the water from the storage well to rise through the return pipe and, through the turbine, to turn an electric machine in generator mode. When we need to store energy, the electric machine is controlled in motor mode being powered from the mains, and rotates the same turbine (reversible) in pump mode to force water down on the return pipe, at the base of the well, lifting the piston. The GPM module is presented only at the level of idea, and the use of reversible technology (reversible turbine/generator group) has the disadvantage that, the pressure being limited (20-30 bar) have low efficiency and require large volumes of water per MWh stored.

From the patent literature is known the invention CN 204061053 U, entitled "Hydropower system for storage of wind energy" published on Dec. 31, 2014. The system according to the invention is comprised of a primary vertical well, a second deeper vertical well, both arranged in a maritime area, a hydroelectric generation unit (turbine-generator group), located in the lower part of the first vertical well, and a group of pumps arranged in the lower part of the second vertical well. Seawater is injected into the first vertical well in the hydroelectric generating unit that supplies the excess electricity through an underground line. Afterward, the water is conducted through a pipe at the base of the second vertical well from where it is pumped to the ground surface, in a basin, by the group of pumps driven by an external wind turbine. Thus, the pool water stores wind energy in the form of potential energy and can then be used to generate electricity.

It is also known the invention DE10 2011012261 A1, published on Aug. 30, 2012, entitled "Electric power storing device for storage tank power plant, recovers potential energy generated by emptying tank into surrounding waters using pump devices under application of electric energy, during filling of tank" (Werner RAU). The device has a tank filled with water above some ballast material (e.g., gravel, concrete), the tank being arranged on a seabed. The tank is connected to external air through pipe or hose so as to enable compression-free exchange of air and formation of an air chamber above the water by emptying the tank. Via an inlet valve, a reversing turbine coupled to an electric motor/generator, water is either fed into the tank from the outside or pumped back into the surrounding water from the inside. The potential energy generated by emptying the tank into surrounding waters using hydraulic or pneumatic pump devices under the application of electric energy, is recovered during filling of the tank. The flowing amount of water is regulated so that the power of reversing turbine and electric motor/generator is adapted to the requirement of electricity grid.

Invention uses of reversible technology (reversible turbine/generator group) having low efficiency.

Further, it is also known the invention US 2012/0049673 A1, published on Mar. 1, 2012, entitled "Generator system for water tank" (Myung Hoe KOO). The invention provides a generator system comprising a water tank in the shape of a cylinder having a top opening and a bottom opening; a dividing wall disposed vertically in the water tank dividing the water tank into a first vertical column and a second vertical column, which are joined in a vicinity of the bottom opening of the water tank. Each of the cylinder plates is disposed and configured to perform a piston movement through the corresponding vertical column of the water tank, said cylinder plates being connected by a pulley through a rope, and each of them having a plurality of one-way holes for allowing water to flow downward only. An electrical motor powered by a solar panel is driving the pulley for alternatively lifting the first cylinder plate or the second cylinder plate; A turbine generator is disposed at the bottom opening of the water tank and for generating electricity with water flow generated by falling cylinder plates, a return pipe, having a lower end disposed at the bottom opening of the water tank and a higher end opened to the top opening of the water tank, being provided for returning water from the turbine generator to the water tank.

The efficiency of the turbine is diminished by the water column in the return pipe.

BRIEF SUMMARY OF THE INVENTION

The technical problems solved by the invention is the reduction of the volume of water needed per MWh stored in a gravitational-hydraulic electric energy storage system—therefore high storage energy density per volume constructed.

The combined gravitational-hydraulic electric energy storage system according to the invention comprises a large heavy piston, weighed/loaded with blocks of material of high volumetric mass density, fixed symmetrically on the surface of the piston for uniform mass distribution, which has the role of accumulating potential gravitational energy by lifting it vertically inside a cylinder with reinforced concrete walls and high quality steel liner, filled with water, the piston guided on the vertical wall of the cylinder through some guides, and being provided, in the center, with a circular opening, in the axis of the cylinder there is a high-pressure channel, which passes through the piston and conducts the pressurized water from the base of the cylinder to an electricity generation system using impulse turbines, the exhaust channel being sealed at the top and de-aerated, the water used in the cycle of electricity production being discharged back into the cylinder, above the piston, through a return channel at atmospheric pressure, and for the cycle of absorption and storage of energy from an electrical network, it also includes a system of high-pressure pumps and variable flow, which takes the water above the piston, through the return channel, and introduces it into the pressure channel, under the piston, causing it to rise therefore accumulating energy.

In relation to the prior art, the gravity-hydraulic combined cycle electricity storage system according to the invention has the following advantages:

has zero environmental cost and zero environmental risk during operation. The system is closed so no substances are exchanged with the environment and the fluid inside (water) is neutral to the environment in case of leakage. In case of turbines or pumps failure de oil is not released in a free running water like in the standard PHS systems. The construction is competed with an extremely low average cost per MWh stored with an extremely low carbon footprint of the materials and equipment put into work. At the end of the life cycle of the plant all materials inside are 100% recyclable.

requires a reduced amount of water per MWh stored the water being reused 100% in a completely closed cycle;

the system has distinct equipment for input and for output so it can be dimensioned unbalanced to allow full loading during off-peak hours (2 to 6 hours or when green energy is available in excess) and unloading during peak hours (6 to 18 hours when little or no green energy is available);

grid operation is 100% profiled on any sense of operation—input or output of electric power—suitable for 100% projected use of uncontrollable green energy (i.e., wind, solar, waves, etc.);

allows the continuous variation of the electric power production between 0 and 100% of the installed output capacity being able to completely profile consumers on a small/medium distribution grid;

allows the continuous absorption of electric power between 0 and 100% of the installed input capacity being able to completely profile production on a small/medium uncontrollable power generation capacity;

allows an unlimited theoretical number of loading-unloading cycles only with mechanical/electrical maintenance costs of the equipment;

allows long-term storage of energy, without loss during storage, term theoretically unlimited;

allows the installation of such units near grid substations due to small footprint and no special geophysical requests; and allows the installation of such units in congested (urban) areas because the occupied area is extremely small and the construction being entirely underground allows the reuse of land from the surface for other purposes plus zero landmark impact.

BRIEF DESCRIPTION OF THE DRAWINGS

An embodiment of the invention is given below in connection with FIG. 1-6 which represents.

DETAILED DESCRIPTION OF THE INVENTION

The combined gravitational-hydraulic electric energy storage system according to the invention operates in an energy absorption and storage cycle, during the periods or time intervals in which the electrical network to which it is connected produces excess electricity or when the operator of the unit decides to store energy, and in a cycle of electricity production for the network, during peak consumption periods or when the operator of the unit decides to extract energy. The system can also be used for long-term or short-term storage of uncontrollable renewable energy (wind and/or solar) to be used during peak consumption periods. The system can be also configured to provide a small-medium grid with 100% consumer profiled power regardless of the power generation fluctuation (with proper dimensioning/adequate sizing).

Figure 1:
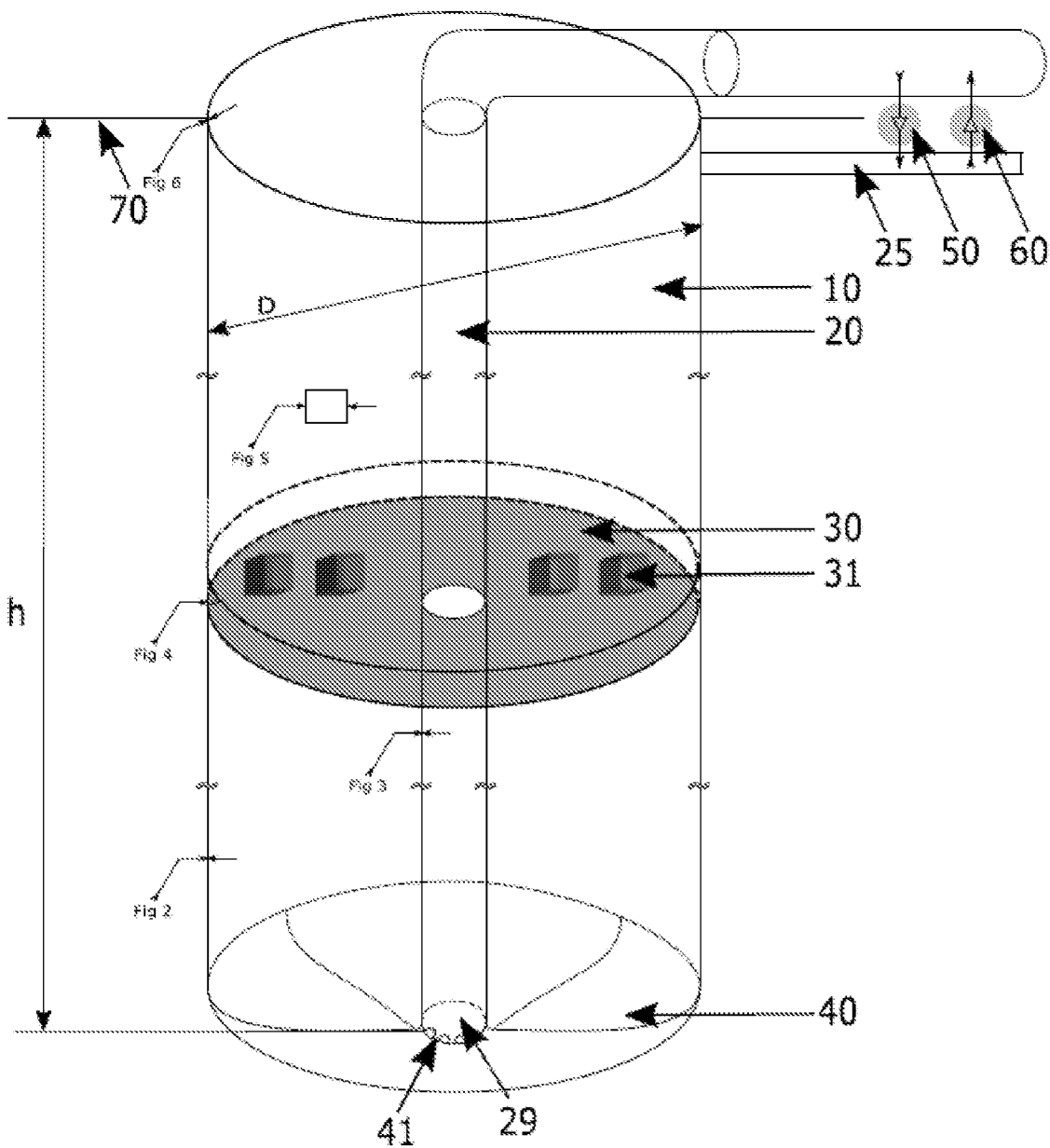
FIG. 1, schematic diagram of a combined gravitational-hydraulic electric storage system, according to the invention.

Referring to FIG. 1, the gravitational-hydraulic combined cycle electricity storage system consists of a right cylinder 10 with reinforced concrete walls and a high quality steel liner to withstand high pressures, having in the axis a high-pressure channel/pipe 20, in the cylinder there is a moving large heavy piston 30, which has the role of accumulating potential gravitational energy by lifting it vertically inside the cylinder 10, which is filled with water under and above the piston. The piston 30 is provided, in the center, with a circular opening to allow the high-pressure channel 20 passing through the piston 30, said high-pressure channel 20 having at least one elbow at the upper end. In the cycle of absorption and storage of energy, the water above the piston 30 is pumped under pressure by the power input system 60 through the high-pressure channel 20, under the piston, causing it to rise therefore accumulating gravitational potential energy, and in the cycle of electricity production the pressurized water from the base of the cylinder 10 is led through the high-pressure channel 20 to an electricity generation system 50, simultaneously with the lowering of the piston 30 using its gravitational potential energy. The pressure in the high-pressure channel is constant regardless of the position of the piston 30. Therefore, input 60 and output 70 of the energy systems can be designed with ease. The water processed in the electricity generation cycle is discharged back into the cylinder 10, above the piston 30, through a return channel 25 at atmospheric pressure, made at the upper level of water filling of the cylinder 10, and built below the freezing depth specific to the geographical area in which the basin is built. Thus, the water in cylinder 10 is used in a closed circuit, being compensated only by the evaporation losses during the operation of the system and is protected from frost.

Cylinder 10 is a large dimensions right cylindrical basin with a diameter and a height of tens of meters, depending on the desired storage capacity. It is built below ground level, by a method described below. The cylinder 10 is having walls made of precast concrete, in the form of precast pre-tensioned cylindrical shell/hollow segments 12 (an example of such concrete segment is depicted in FIG. 5b), said concrete segment being post-tensioned with steel strands, the cylinder 10 being provided at the top with a cylindrical collar 70 (shown in FIG. 6), and at the bottom with a reverse positioned dome 40. The cylinder 10 is coated inside with a high-quality steel liner 11. The cylinder 10 is filled with water, the piston 30 being inside the volume of water. The piston 10 is loaded with weights 31 made of blocks of material with high volumetric mass density, fixed symmetrically on the surface of the piston 30. Above the piston 30 is water up to the upper level of the cylinder described being in line with the upper part of the return channel 25. The weights 31 are fixed symmetrically on the surface of the piston, being placed in the installation process, simultaneously in pairs on diametrically opposite positions with the scope of uniform mass distribution.

Axially, in the cylinder 10, there is the high-pressure channel 20, which leads the water under pressure to a power generation system 50 made of impulse turbines, for example Pelton type. The high-pressure channel 20 is provided, at the bottom, with a water inlet-outlet 29, through which, depending on the operating cycle, water is introduced or extracted from under the piston. High-pressure channel 20 is sealed at the top and de aerated. The water processed in the electricity generation system 50 is discharged back into the cylinder 10 through the return channel 25, the channel being at atmospheric pressure. In order to input energy from the exterior, the input system 60 contains a system of pumps of high pressure and variable flow takes the water from the return channel 25 (above the piston 30) and introduces it into the high-pressure channel 20, being forced under the piston 30 therefore lifting it and accumulating potential energy. The two water circuits are totally separate. The high-pressure circuit starts at the base of the cylinder and stops in the turbine access valves (which are only open in the power generation cycle) and in the direction valves at the outlet of the high-pressure pumps (which only open in energy absorption and storage cycle).

Water is an incompressible liquid and therefore an ideal agent for transmitting potential energy. The energy is stored inside the system through the vertical position of the piston 30. The cylinder 10 being full of water under and above the piston, the pressure in the high-pressure channel 29 will be constant regardless of the vertical position of the piston 30. In order to use a small amount of water it is necessary that the total weight of the piston 30 (together with the load weights 31) be high; the higher the total weight of the piston 30, the higher the hydrostatic pressure, so the higher the amount of energy stored in the system per cubic meter of water.

Figure 2:
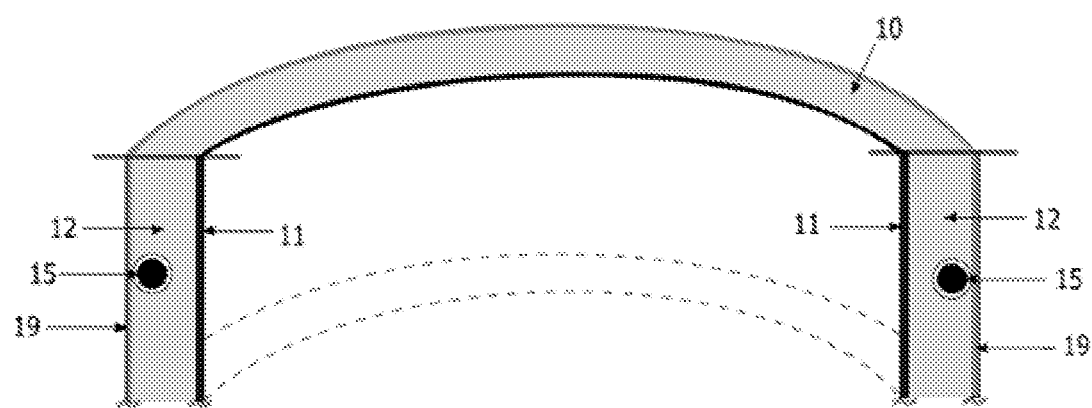
FIG. 2, design detail of the cylinder wall/cylindrical basin.

In an example embodiment, the cylinder 10 is constructed below ground level with a depth h of the order of tens of meters/between 20-100 m and a diameter D between 10 and 75 m. The cylinder is made of pre-tensioned precast concrete segments 12, joined and post-tensioned with steel strands 15 and coated inside with a high-quality steel liner 11. In FIG. 2 a detail of the cylinder wall 10 is depicted. On the inner face of the vertical wall of the cylinder there is a high quality steel liner 11, liner segments are to be manufactured in factory them installed, welded and rectified on site, this will allow the piston 30 to slide easily and to take the pressure in the areas of horizontal shear from the joint between the precast concrete segments 12. The high-quality steel liner works in combination with the pre-tensioned segments being also post-tensioned with steel strands to take the hoop stress in the cylinder 10. On the outer face of the vertical wall of the cylinder is applied a waterproofing 19 which also serves to allow the taking over in the ground of expansions and compressions during construction and operation.

In order to ensure the integrity of the system at high operating pressures with the lowest possible construction costs, the pre-tensioned precast concrete segments 12 are manufactured in a controlled way in a manufacturing plant, being pre-tensioned before casting and provided in the part that will be to the outside of the cylinder 10 with holes through which high quality steel strands 15 will be drawn. They will be post-tensioned on site, after installation, up to the hoop stress needed to balance, with the added resistance of the high quality steel liner 11 the equivalent to the hydrostatic pressure obtained from the weight loading 31 of the piston 30, so that the concrete in the wall will work only compressed regardless of the position of the piston for maximum efficiency. Also, the pre tensioned precast concrete segments 12 are provided at the edges, from the manufacturing plant, with some access places to some connecting elements 72 for the assembly between them as well as with the gap necessary for the strand tensioning devices-strand holes. In the embodiment, said strand holes have the shape of internal toroidal parallel channels/holes to the length of the concrete segments 12.

Figure 5A:
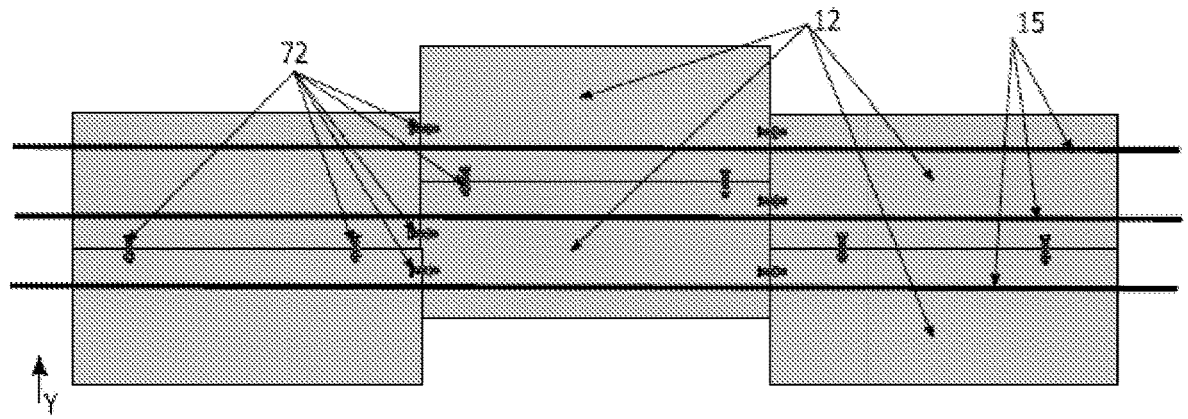
FIG. 5a, design schematic for the concrete wall of the cylinder.
Figure 5B:
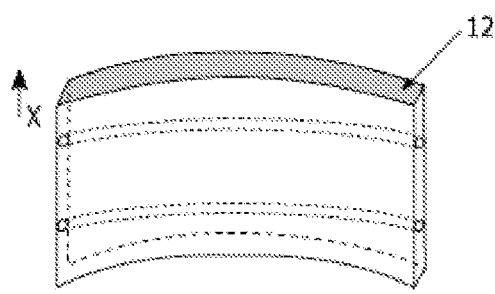
FIG. 5b, design for the precast concrete segment of the cylinder.

The assembly design of the prefabricated units is depicted in FIG. 5a. The prefabricated elements—pre-tensioned precast concrete segments 12 are mounted in position by means of removable connecting elements 72 of the screw and nut type. The prefabricated elements 12 will be mounted alternately (staggered vertically) so that the strand holes continue, as shown in FIG. 5a, but also avoid continuous joining lines. The hydrostatic pressure below is very high (200-500 bar), and the one above is low (0-10 bar) which leads to a consistent/significant circular shear force. In order to take it over, the pre-tensioned precast concrete segments 12 are alternately assembled precisely to avoid continuous joint lines and therefore to reduce the necessary resistance to the joints (and implicitly the cost). In order to avoid deformation of the high quality steel liner 11, after the installation and tensioning of the high quality steel strands 15, the access points to the connecting elements 72 and the stretching elements of the strands 15 and the joints between elements will be sealed in site with high-density concrete.

Figure 6:
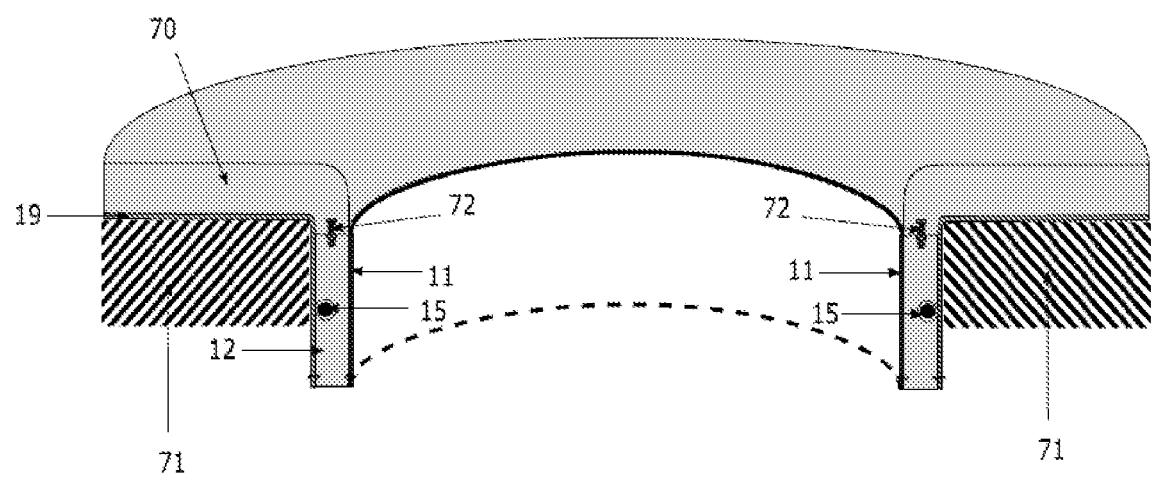
FIG. 6, design for the cylinder collar.

Referring to FIG. 6. which depicts a proposed site design on the land surface (around the upper part of the future cylinder 10) a foundation 71 is made in the shape of a circular ring dimensioned according to the geomorphological characteristics of the terrain and the dimensions of the cylinder 10 and the proposed future weight of the piston 30 including weights 31. Above the foundation 71, a dense reinforced concrete slab 70 will be constructed on site which continues downwards with a cylindrical neck having the same proposed diameter as cylinder 10 and which also contains connecting elements 72 necessary for fastening/mounting the pre-tensioned precast concrete segments 12. The construction will be carried out by digging downward in stages, depending on the size of the designed pre-tensioned precast concrete segments 12 so as to ensure easy access from the bottom of the excavation, for the installation of the prefabricated items 12, the installation of the strands 15, mounting the high quality steel lining 11. Once the designed minimum (bottom) level of the installation has been reached, the bottom reversed dome 40 will be steel reinforced and poured form concrete in site, providing some clamping ears 41 connected to the steel reinforcement of the reversed bottom dome and to the high-pressure channel 20 for the water inlet-outlet 29, spaces being provided between the clamping ears 41 for water circulation. The gripping lugs must ensure the discharge of the upward force applied by the high-pressure channel 20 towards the reinforcement of the bottom reversed dome 40. The reversed dome is designed with the scope of provide the foundation needed to be anchoring the high-pressure channel using the own system weight, therefore further reducing construction costs.

Figure 3:
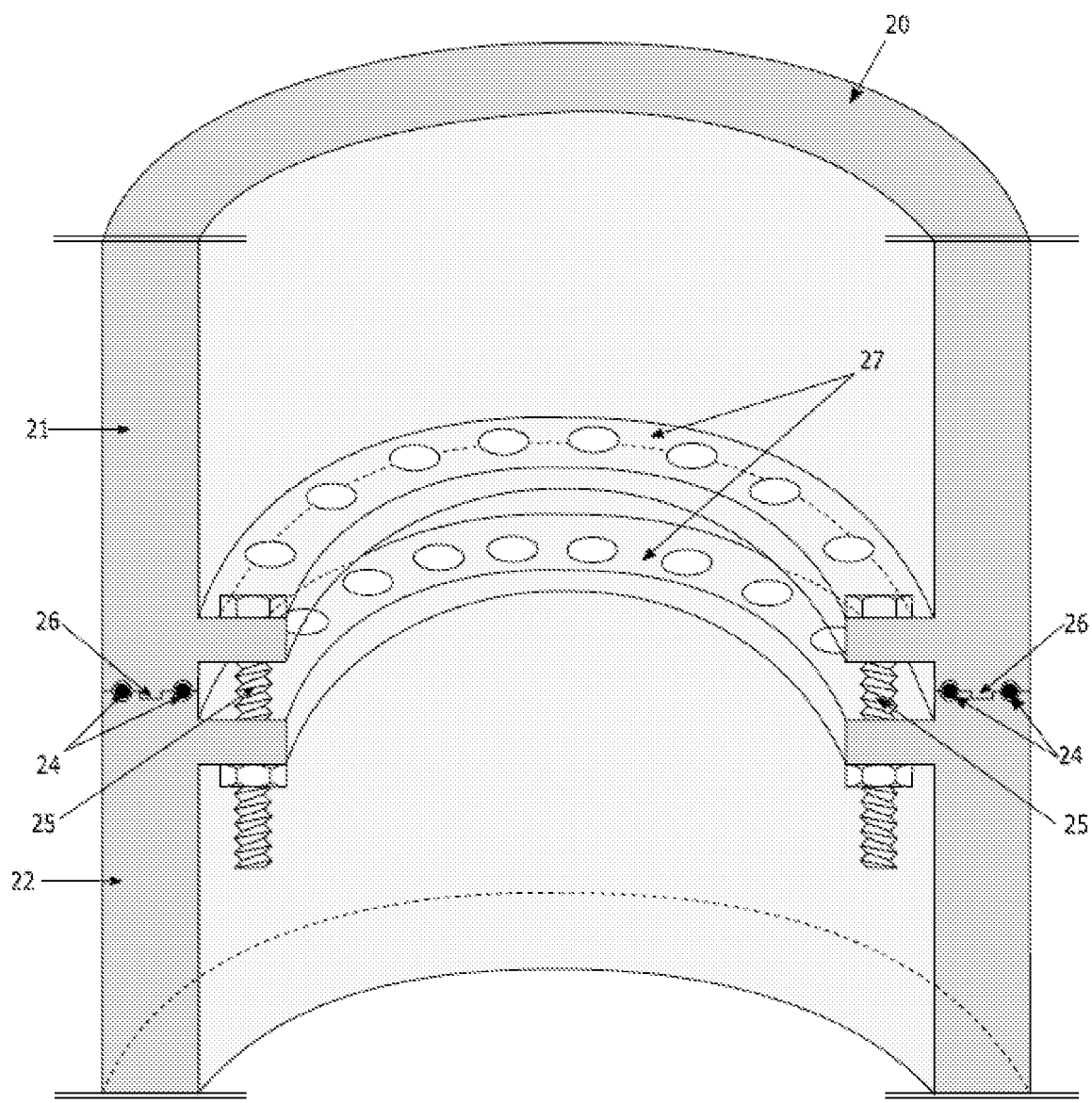
FIG. 3, detail of the pressure channel design.

The high-pressure channel 20 is made of high quality steel (for example, but not excluding other usable variants, steel 1.5423 according to EN 10027-2), having a diameter D between 1-10 m and being manufactured in a manufacturing facility in sections of lengths between 3-12 m depending on the site access restrictions and cost analyses. The steel segments are manufactured, and surfaces corrected to tolerances better than 1 mm, at the ends being provided with joint flanges to allow a minimum striation exposed to the piston circular water seals/insulation gasket 33. The detail of the joint is depicted in FIG. 3, wherein an upper section 21 is assembled by a precision tongue and groove joint 26 to a lower section 22, the fixing grip being made inside the high-pressure channel by means of corresponding flanges 27 and removable joint elements 25, for example screw and nut type. At the joint between the sections, the flange is provided with holes, preferably semi-toroidal, corresponding to some rubber gaskets 24, preferably toroidal.

Figure 4:
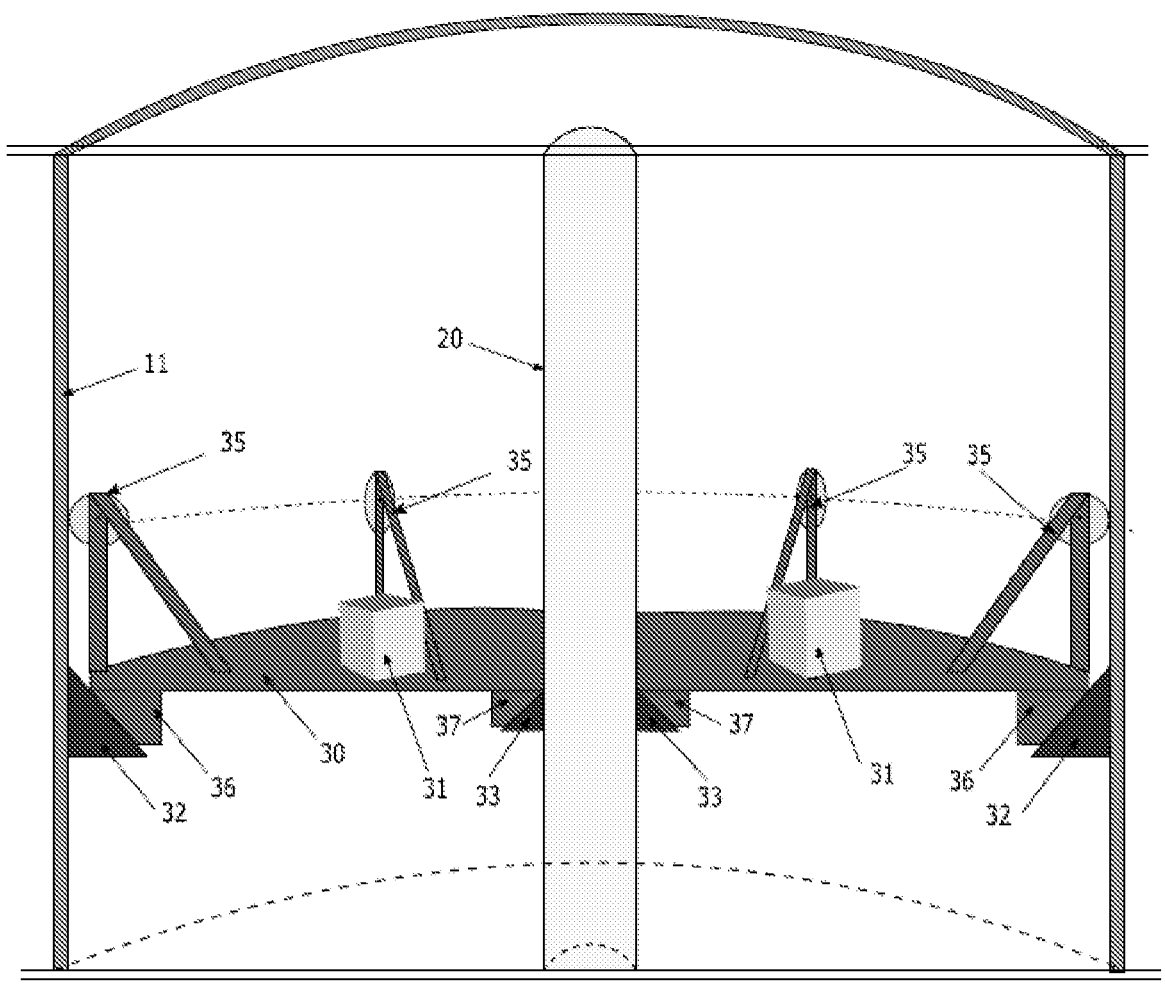
FIG. 4, detail of the heavy piston design.

FIG. 4 shows a design of the heavy piston 30. The piston is made of steel, manufactured in a plant and mounted on site. The piston 30 can be constructed, for example, of sheet steel segments, having the shape of a circle sector with the tip at the center cut out, assembled to form the designed form. This piston 30 is subjected only to uniformly distributed static load, it being practically only a separating membrane between two areas with pressure difference. Therefore, in order to avoid deformation of the piston, a support grid made of steel T-profiles is sufficient. The piston 30 is provided with roller guides 35 which have the role of guiding the piston inside the cylinder to ensure the desired horizontal position of the piston while it moves up and down. The guides are made on a case-by-case basis in number and size, depending on each installation. In a proposed designed illustrated in FIG. 4, the roller guides 35 have the shape of rectangular triangles made of steel profile, being installed on the upper surface of the piston 30. On the piston 30 are installed/fixed blocks of material with high volumetric mass density (31), the blocks being manufactured in a plant and isolated from contact with water to avoid degradation in time. The blocks 31 will be loaded and unloaded from the piston (during installation and possible maintenance operations) in an order that will avoid unbalancing the piston 30 to minimize the resistance required by the guides 35.

On the lower surface of the piston 30, on the outside lower edge towards the steel lining of the cylinder, as shown in FIG. 4, a monolithic steel guide 36 will be provided designed to discharge in gradient the pressure on a circular hydraulic insulation gasket 32 with respect to the steel liner 11 of the cylinder 10. Also, in the central part where the piston 30 travels over the high-pressure channel 20, a monolithic steel guide 37 will be provided, designed to discharge in gradient the pressure on a circular hydraulic insulation gasket 33 to the outer wall of the high-pressure channel 20.

The electric energy input (absorption) system 60 is distinct from the electric energy generation (production) system 50. This allows the use of optimized and highly efficient electric and hydraulic equipment. The production of electric energy is done with impulse turbines, for example, with Pelton turbines, which ensures a low water consumption, so the system can increase the amount of energy stored per cubic meter of water. The system can also be dimensioned unbalanced in the sense that it allows input levels completely different versus output levels (e.g., full loading during off-peak hours and unloading during peak hours).

The power generation system 50 may contain one or more Pelton turbines connected to electric power generators. The electric power generation system 50 can be a classic Pelton system with flow regulation, so with a variation of continuous electric power production between 0 and 100% of the installed capacity through the linear control of the intake valves in the turbines. The energy input (absorption) system 60 contains several high-pressure pumps in order to be able to absorb an adjustable amount of energy and obtain a high efficiency, the set of pumps contains only one or two with variable flow, the rest being with flow and pressure fixed, so cheaper, more efficient and with less maintenance. The design of energy input system 60 maximizes the power transfer efficiency by using fixed power synchronous electric motors for fixed power steps and variable power electric motors for linear adjustable values.

In order to continuously absorb electricity in a controlled manner, for example, in the case of a wind farm, the electrical energy absorption system (input system) (60) is provided with several pumps of constant pressure and constant flow attached to electric motors with Fixed rated power and no adjusting elements, they have low cost, low maintenance and high efficiency. To continuously adjust in the 0-100% range will use one or two pumps with constant pressure, but with variable flow with electric motors attached provided with a power control system used. These variable systems will have a unit capacity, compared to fixed systems of 150% to allow a controller to continuously adjust the energy absorption regardless of the direction and speed of variation of the power required to be absorbed.

Since the present invention has also been described with reference to a preferred embodiment, it is to be understood that many alternatives, modifications and variations will be apparent to those skilled in the art. Accordingly, it is intended to include all such alternatives, amendments and variants that fall within the spirit and scope of their application, as set out in the appended claims.

The invention claimed is:

1. A combined gravitational-hydraulic electric energy storage system comprising a heavy piston, which is placed in a cylinder filled with water, the piston being provided with sliding gaskets to prevent leakage around the piston, and a vertical return pipe including a high-pressure channel, which connects the water flow from the bottom of the cylinder to an electric, power generation system, wherein the piston is weighted with blocks of material of high volumetric mass density fixed symmetrically on the surface of the piston for uniform mass distribution, which has the role of accumulating potential gravitational energy by lifting the piston vertically inside the cylinder with reinforced concrete walls and having an inner face of the cylinder covered by a steel liner, the piston being guided on the walls of the cylinder by way of roller guides, and being provided, in a center of the piston, with a circular opening, said high-pressure channel being located in an axis of the cylinder, said sliding gaskets, preventing leakage both with respect to said steel liner of the cylinder and with respect to said high-pressure channel which passes through the center of the piston and which leads pressurized water from the base of the cylinder to the electric power generation system using impulse water turbines, the high-pressure channel having an elbow at the top and being sealed at an upper end as well as de-aerated, the water used in the process of electricity production by the electric power generation system being discharged back into the cylinder, above the piston through a return channel at atmospheric pressure, and an electrical energy input system comprising high-pressure pumps with fixed and variable flow, which take the water from above the piston, through the return channel, and it introduce the water into the high-pressure channel, under the piston, causing the piston to rise.

2. The combined gravitational-hydraulic electric energy storage system as claimed in claim 1, wherein the cylinder is a large cylindrical basin of the order of, one of, meters or tens of meters, depending on the desired storage capacity, built below ground level, having the walls constructed by joining precast concrete segments, in the form of cylindrical shell segments provided with strand holes, said concrete segments being mounted in position by way of removable connecting elements and post-tensioned with steel strands, the cylinder being provided at the top with a dense steel reinforced concrete slab which continues downwardly with a cylindrical collar having the same diameter as the cylinder and which rests on a foundation, and at the bottom with a reversed dome, the walls of the cylinder being lined on the inside with a high quality steel liner made by cylindrical liner segments, allowing the piston to slide easily, and on the outside with a waterproofing which has the role of allowing the taking over in the ground of the expansions and compressions during operation as well as protection of construction against the water from the ground.

3. The combined gravitational-hydraulic electric energy storage system as claimed in claim 2, wherein the cylinder is provided with clamping lugs for the high-pressure channel which also constitute a water outlet between the lugs and being provided with spaces for water circulation.

4. The combined gravitational-hydraulic electric energy storage system according to claim 1, wherein the piston is made of steel, factory machined and mounted on site, having mounted on an upper surface the blocks, factory machined and insulated from contact with water, and the roller guides having the role of ensuring its horizontal position, and on a lower surface of the piston, at its edge, a monolithic steel guide is provided, which discharges the pressure on a circular hydraulic sliding gasket in a gradient with respect to the steel liner of the cylinder, and in the central part where the piston intersects the high-pressure channel, being provided with monolithic steel guides to ensure unloading the pressure in gradient on another circular hydraulic sliding gasket relative to an outer wall of the high-pressure channel.

5. The combined gravitational-hydraulic electric energy storage system according to claim 1, wherein the high-pressure channel is a cylindrical pipe with at least one said elbow at the upper end made of high quality steel being manufactured in sections and being provided at the ends with joint flanges to allow a minimum striation exposed to the piston circular water seals, where an upper section is assembled by a precision tongue and groove joint to a lower section, a fixing grip being made inside the high: pressure channel by way of corresponding flanges and removable joint elements, at the joint between the sections, the flange being provided with holes, corresponding to rubber gaskets.

6. The combined gravitational-hydraulic electric energy storage system according to claim 1, wherein the piston is provided with a monolithic steel guide being designed to discharge in gradient the pressure on a circular hydraulic sliding gasket with respect to the steel liner of the cylinder.

7. The combined gravitational-hydraulic electric energy storage system according to claim 1, wherein the piston is provided with a monolithic steel guide being designed to discharge in gradient the pressure on a circular hydraulic sliding gasket with respect to the outer wall of the high-pressure channel.

8. The combined gravitational-hydraulic electric energy storage system as claimed in claim 1, wherein the electrical energy input system with the scope of adjustable input power in the 0-100% range is provided with a plurality of constant pressure and constant flow pumps driven by electric motors with a fixed rated power and without power/speed adjustment, and to continuously adjust in the range of 0-100% will use one or more pumps with constant pressure, but with variable flow driven by electric motors provided with power/speed control adjustment.

9. The combined gravitational-hydraulic electric energy storage system according to claim 1, wherein the electric power generation system with the scope of adjustable output power in the 0-100% range comprises one or more Pelton turbines connected to electric generators, each with flow control in the range of 0-100%.

* * * * *